H. J. Batchelder,
Tooth Extractor.

N° 15,965.      Patented Oct. 28, 1856.

UNITED STATES PATENT OFFICE.

HAZEN J. BATCHELDER, OF WEST FAIRLEE, VERMONT.

TOOTH-EXTRACTOR.

Specification of Letters Patent No. 15,965, dated October 28, 1856.

*To all whom it may concern:*

Be it known that I, HAZEN J. BATCHELDER, of West Fairlee, in the county of Orange and State of Vermont, have invented an Improved Tooth-Extractor; and I do hereby declare that the same is fully described and represented in the following specification and the accompanying drawings, of which—

Figure 4:
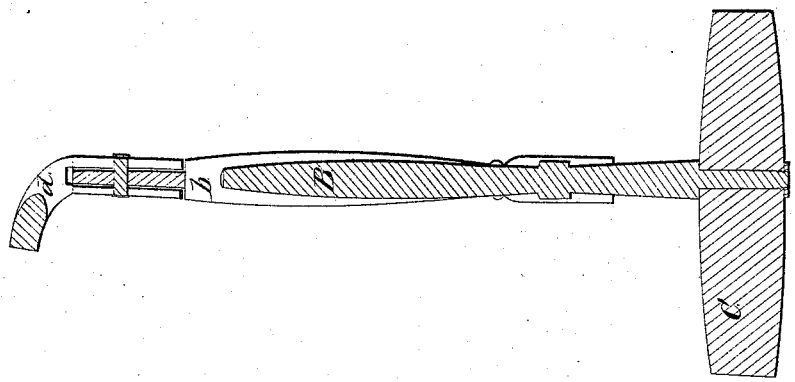
Figure 3:
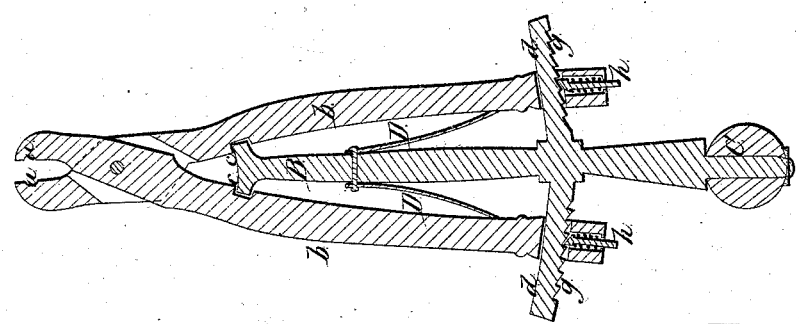
Figure 2:
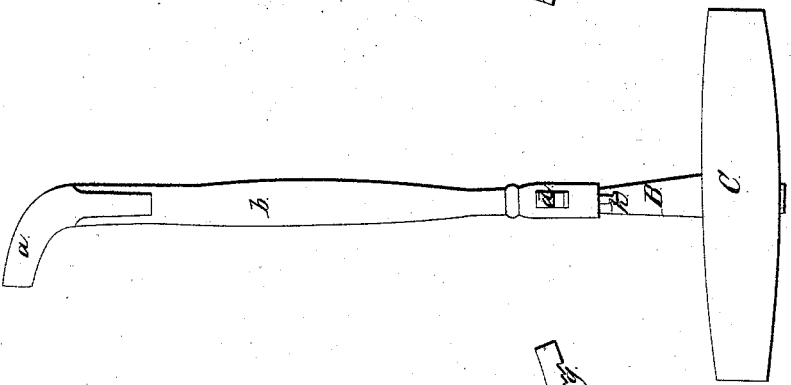
Figure 1:
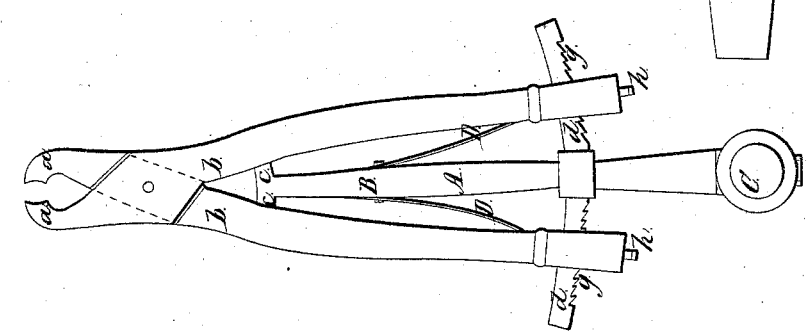

Figure 1, exhibits a top view of said instrument. Fig. 2, a side elevation of it. Fig. 3, a horizontal section of it. Fig. 4, a vertical and longitudinal section.

In these drawings, A, denotes a pair of dental forceps, whose jaws are shown at $a, a$, as applied to crossed levers $b, b$. Extending between the longer arms of said levers is a shank or rod, B, having a handle, C, affixed to one end of it. It has also, four arms $c, c$, and $d\ d$, extending horizontally from it and into the two longer arms of the forceps and so that the latter arms may move freely on said arms $c$, and $d$, during the process of either opening or closing the jaws of the forceps. Springs, D, D, are affixed to the shank, A, and made to bear against the superior arms $b, b$, of the forceps. Each arm, $d$, extends entirely through its arm, $b$, and is serrated or provided with angular teeth on its outer edge as shown at $g$, each arm, $b$, being furnished with a spring latch or bolt, $h$, to work in connection with the serrated part, $g$.

In using the instrument so constructed, and when its jaws embrace a tooth, the operator has only to apply his left hand to the longer arms of the forceps so as to compress said arms together, and close the jaws of the forceps firmly upon the tooth, the spring latches or bolts serving to maintain the grasp of the jaws on the tooth. The fixation of the instrument having been thus effected, the operator is enabled to use it as a turnkey while the handle is held in his right hand.

The advantage of this instrument over the common dental trunkey is, that with the latter, the grasp of the jaws upon the tooth is increased during the extracting process and consequently, the tooth (particularly if much decayed) is very liable to be broken, but with my improved instrument, the grasp upon the tooth, once having been attained and prior to the exertion necessary for the extraction of it, remains the same, or about the same during the process of drawing it. Therefore with my tooth extractor the danger of breaking the tooth is greatly diminished in comparison to what exists when the key is employed.

After a tooth has been extracted, we have only to draw back two spring bolts, in order to enable the springs, D, D, to throw open the forceps so as to release the tooth from the jaws.

What I claim as my invention is—

The above described improved dental instrument, or combination of forceps, the latching mechanism, the supporting shank and handle applied and arranged together substantially as specified.

In testimony whereof I have hereunto set my signature this 16th day of September A. D. 1856.

HAZEN J. BATCHELDER.

Witnesses:
R. H. EDDY,
F. P. HALE, Jr.